United States Patent [19]

Hayashi

[11] Patent Number: 4,938,385
[45] Date of Patent: Jul. 3, 1990

[54] POWDER FEEDING APPARATUS

[75] Inventor: Tsunemi Hayashi, Shizuoka, Japan

[73] Assignees: Akatake Engineering Co.; Shin-etsu Chemical Co., Ltd., both of Tokyo, Japan

[21] Appl. No.: 337,059

[22] Filed: Apr. 12, 1989

[30] Foreign Application Priority Data

Sep. 5, 1988 [JP] Japan .................................. 63-220325

[51] Int. Cl.$^5$ ........................ B67D 5/08; G01G 13/00
[52] U.S. Cl. ...................................... 222/55; 222/638;
222/644; 222/77; 177/25.19; 177/165
[58] Field of Search ............... 177/25.19, 165; 222/52,
222/55, 638, 639, 642, 644, 71, 77

[56] References Cited

U.S. PATENT DOCUMENTS

| 2,544,155 | 3/1951 | Harkenrider | 222/642 |
|---|---|---|---|
| 2,714,472 | 8/1955 | Richardson | 222/638 |
| 2,969,893 | 1/1961 | Peeters | 222/642 |
| 4,137,976 | 2/1979 | Grayson, Jr. | 177/25.19 |
| 4,331,262 | 5/1982 | Snyder et al. | 222/644 |
| 4,393,950 | 7/1983 | Klopfenstein et al. | 177/165 |
| 4,448,272 | 5/1984 | Keller et al. | 177/25.19 |
| 4,583,605 | 4/1986 | Hirano | 177/165 |

FOREIGN PATENT DOCUMENTS 60-66120  4/1985  Japan .................................. 222/425

Primary Examiner—Michael S. Huppert
Assistant Examiner—Steven Reiss
Attorney, Agent, or Firm—Beveridge, DeGrandi & Weilacher

[57] ABSTRACT

A powder feeding device comprising a metering hopper for metering a powdery material supplied from a holding hopper, a weight measuring device for measuring the weight of the powdery material in the metering hopper, a device for opening and closing a discharge opening formed in the metering hopper and a control device for controlling the action of the opening and closing device. The control device has a timer, a device for setting a discharge interval, and a device for correcting the standard discharge interval set by the discharge interval setting device. The discharge interval correcting device corrects the standard discharge interval on the basis of a measured signal from the weight measuring device.

5 Claims, 5 Drawing Sheets

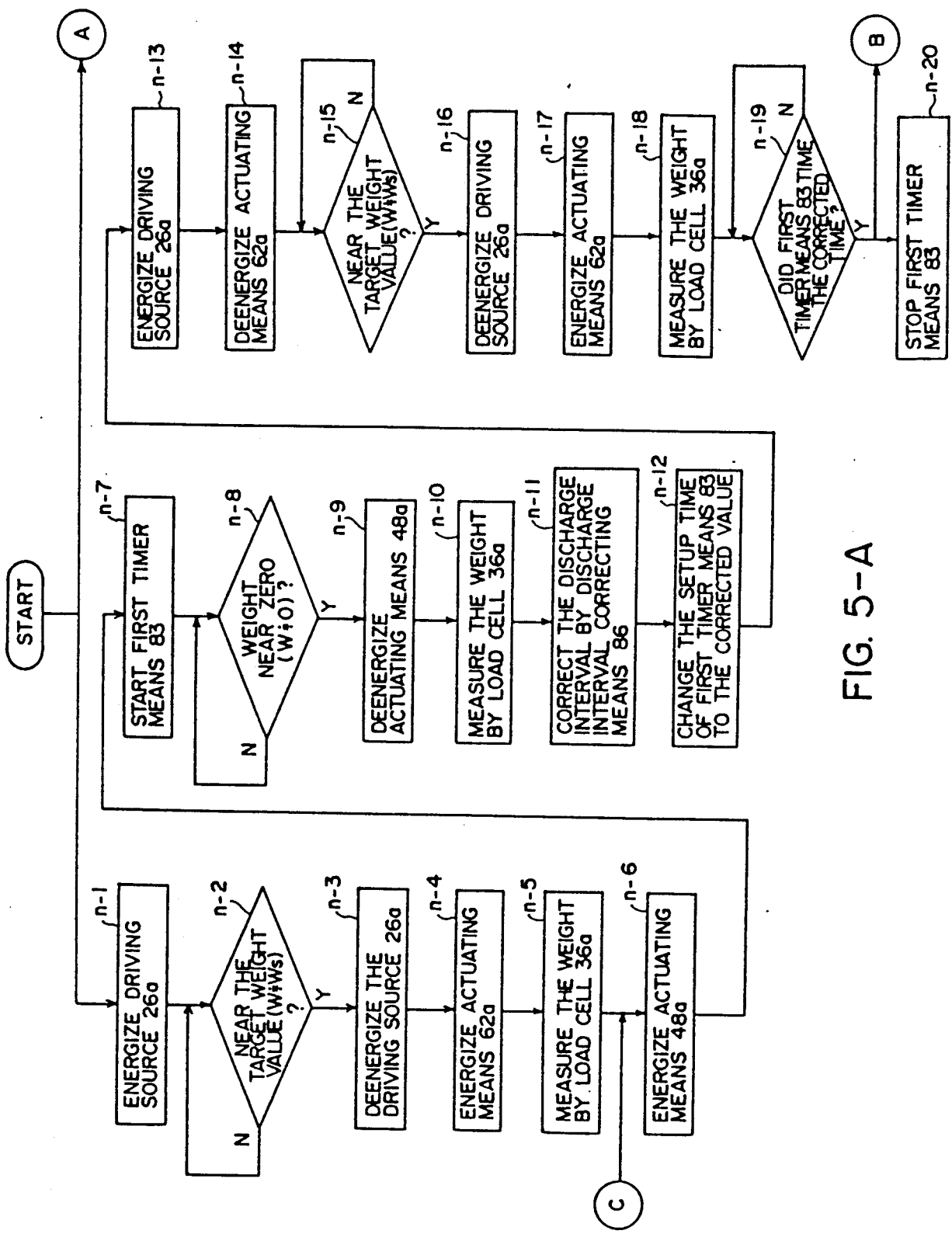
FIG. 5-A

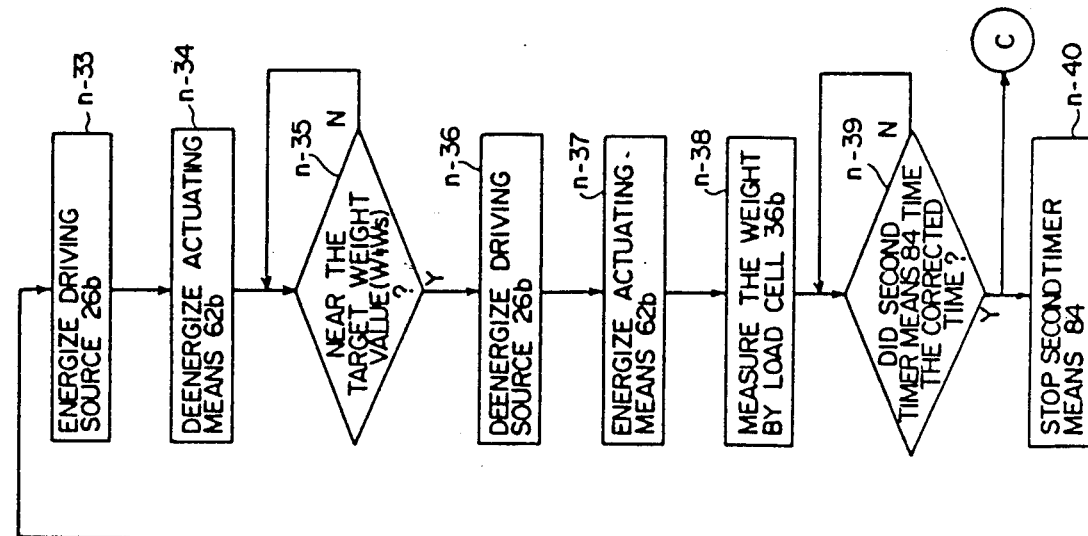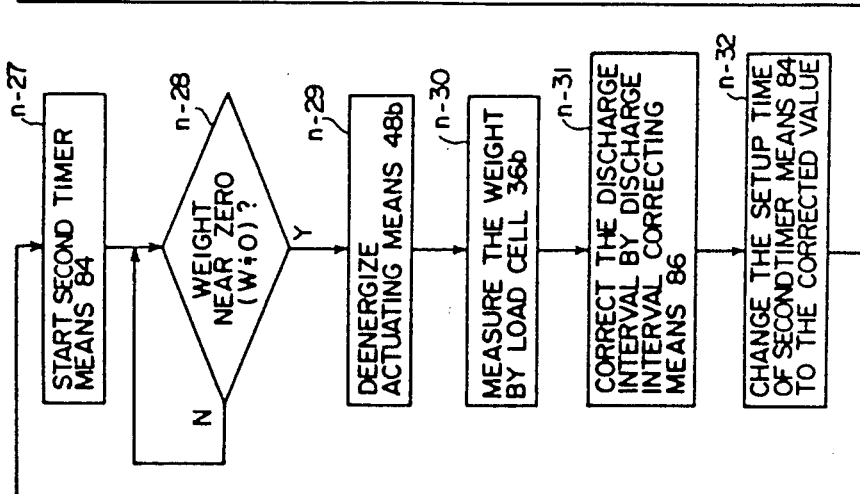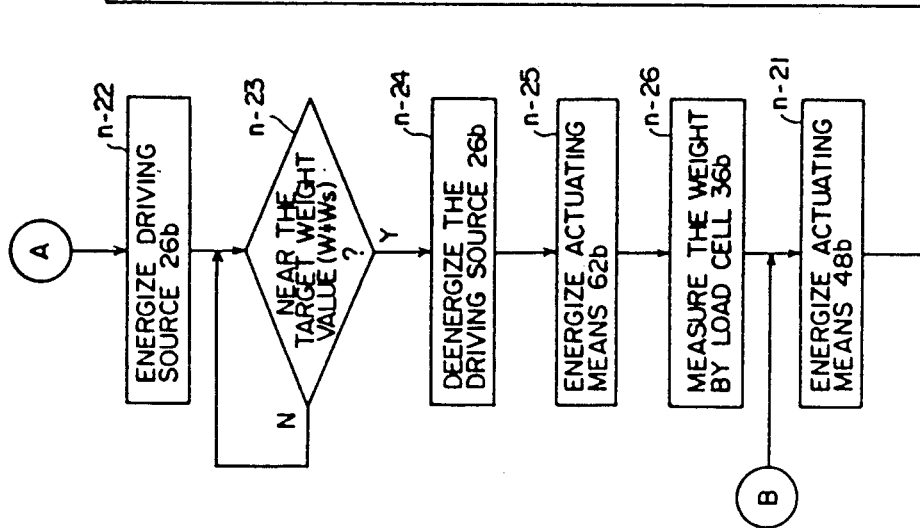
FIG. 5-B

POWDER FEEDING APPARATUS

Reference is made to Ser. No. 07/132,238 filed on Dec. 14, 1987 and directed at related subject matter.

FIELD OF THE INVENTION

This invention relates to a powder feeding apparatus.

DESCRIPTION OF THE PRIOR ART

As disclosed in Japanese Laid-Open Patent Publication No. 159722/1988, for example, there has already been proposed and come into practical use a powder feeding apparatus comprising a holding hopper for holding a powdery material, a metering hopper for metering the powdery material supplied from the holding hopper, a load cell for measuring the weight of the powdery material which has been supplied to the metering hopper, a means for opening and closing a discharge opening in the metering hopper, and a control means for controlling the actuation of the opening and closing means. The control means is provided with a timer means and a means for setting a discharging interval. In operation, the powdery material in the holding hopper is sent to the metering hopper. The weight of the powdery material supplied to the metering hopper is then measured by the load cell. When a predetermined weight of the powdery material has been supplied to the metering hopper, the supply of the powdery material from the holding hopper is stopped. When the time set by the discharge interval setting means has elapsed (by then, a predetermined weight of the powdery material is supplied to the metering hopper) after the start of supplying the powdery material from the holding hopper, the control means energized the opening and closing means to open the discharge opening of the metering hopper, and the powdery material metered in the metering hopper is discharged through the discharge opening.

This powder feeding apparatus, however, has the following problems to be solved. In order to meter the powdery material relatively accurately and efficiently, it is desirable to supply it (to about 70 to 90% of the preset value) to the metering hopper first at a relatively high speed, and then at a relatively low speed till the preset value is reached. This way of supplying the powdery material, however, requires time for metering the powdery material, and the powdery material cannot be discharged from the metering hopper at short time intervals. Furthermore, the powdery material cannot be accurately metered because of, for example, the pulsating movement of the powdery material conveyed from the holding hopper and the heat at the time of its falling onto the metering hopper. Usually, a transfer means is used to supply the powdery material from the holding hopper to the metering hopper, and owing to the inertia, the supply of the powdery material cannot be stopped as soon as the transfer means is deenergized. This results in an inaccurate metering of the powdery material. Accordingly, when such a powder feeding apparatus is combined with, for example, a level feeding means and applied to continuous feeding, the amount of the powdery material discharged from the metering hopper is not constant, and the powdery material cannot be fed in a constant amount.

SUMMARY OF THE INVENTION

It is a primary object of this invention to provide a powder feeding apparatus which can accurately meter a powdery material at a high speed and in combination with a level feeding means, can be conveniently applied to continuous powder feeding.

The present invention provides a powder feeding apparatus comprising a holding hopper for holding a powdery material, a metering hopper for metering the powdery material supplied from the holding hopper, a weight measuring means for measuring the weight of the powdery material in the metering hopper, an opening and closing means adapted to be selectively held at an opening position at which it opens a discharge opening in the metering hopper and a closing position at which it closes the discharge opening and a control means for controlling the actuation of the opening and closing means, the control means having a timer means for timing and a discharge interval setting means for setting an interval of discharging the powdery material; wherein the control means further includes a discharge interval correcting means for correcting a standard discharge interval set by the discharge interval setting means, the discharge interval correcting means corrects the standard discharge interval on the basis of a measured signal from the weight measuring means, and when the timer means times the corrected discharge interval, the opening and closing means is held at the opening position.

BRIEF DESCRIPTION OF THE DRAWINGS

FIGS. 5-A and 5-B are flow charts respectively illustrating the controlling of the powdery feeding apparatus of FIG. 1 by a control means.

DETAILED DESCRIPTION OF PREFERRED EMBODIMENTS

One specific embodiment of the powder feeding apparatus in accordance with this invention will be described in detail with reference to the accompanying drawings.

Figure 1:
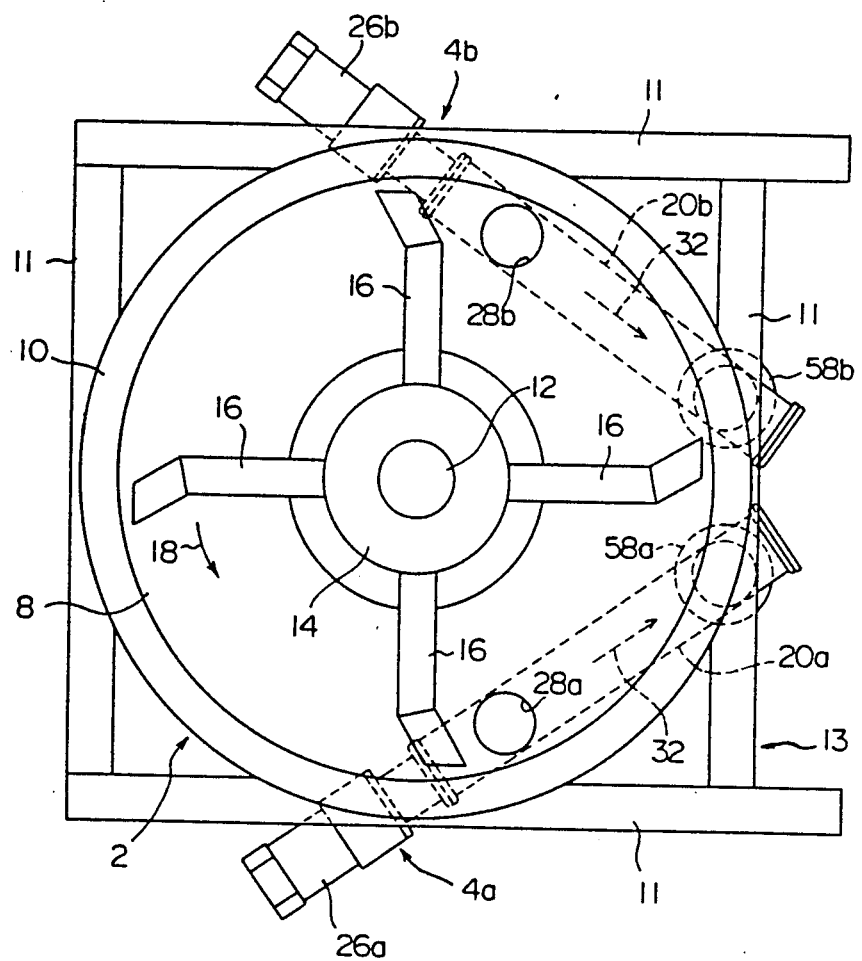
FIG. 1 is a top plan view showing the essential parts of one embodiment of the powder feeding apparatus constructed in accordance with this invention.
Figure 2:
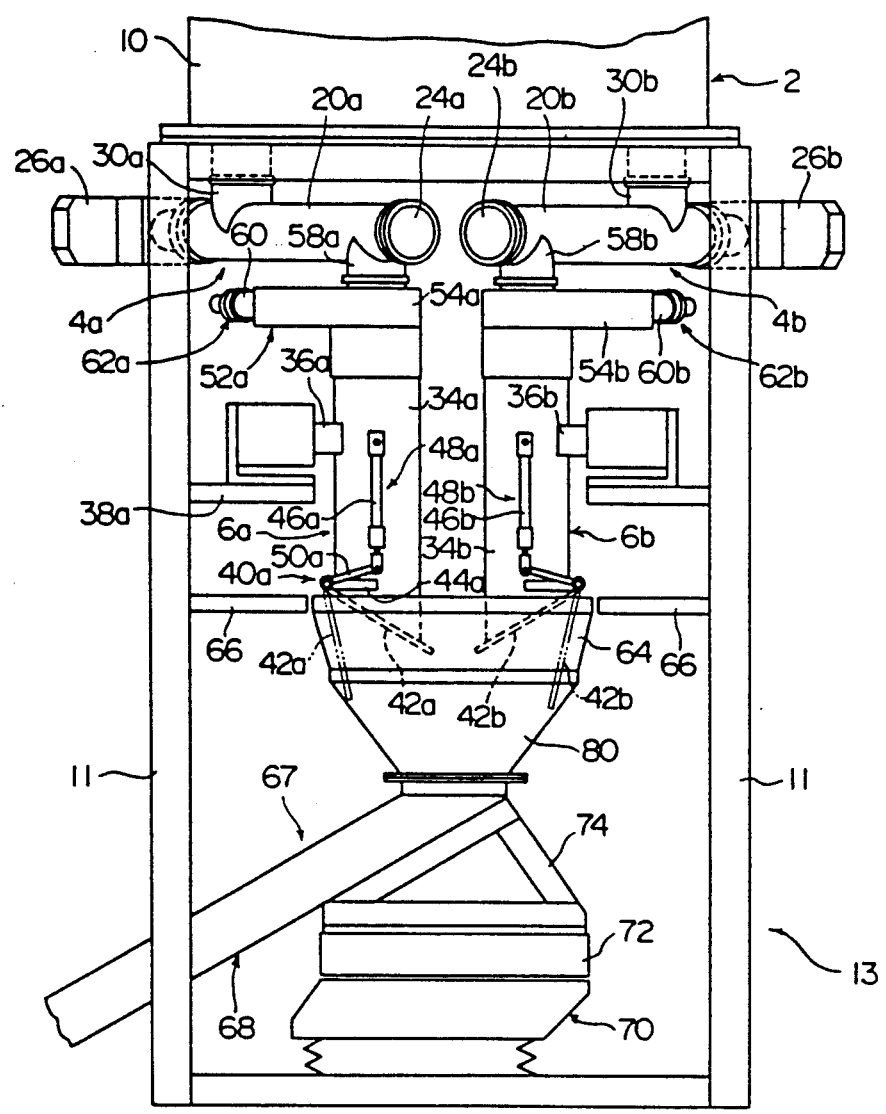
FIG. 2 is a front view showing the essential parts of the powder feeding apparatus of FIG. 1.

With reference to FIGS. 1 and 2, the illustrated powder feeding apparatus is provided with a holding hopper 2, transfer means 4a and 4b and metering hoppers 6a and 6b. The illustrated hopper 2 has a circular bottom wall 8 and a cylindrical circumferential side wall 10 extending upwardly from the circumferential side edge of the bottom wall 8, and is adapted to hold therein a powdery material to be fed (such as a fine charcoal powder). A rotating shaft 12 is rotatably mounted on the bottom wall 8 of the holding hopper 2. A plurality of (four in the illustrated embodiment) agitating members 16 are mounted on the rotating shaft 12 via a fixing sleeve 14. Each of the agitating members 16 extends radially outwardly from one end portion fixed to the sleeve 14 to near the inside surface of the circumferential side wall 10. The agitating members 16 move in the direction shown by an arrow 18 and prevents blocking of the powdery material in the holding hopper 2. The holding hopper 2 is mounted on the upper end portion of a frame structure 13 constructed by properly linking various frames.

Figure 4:
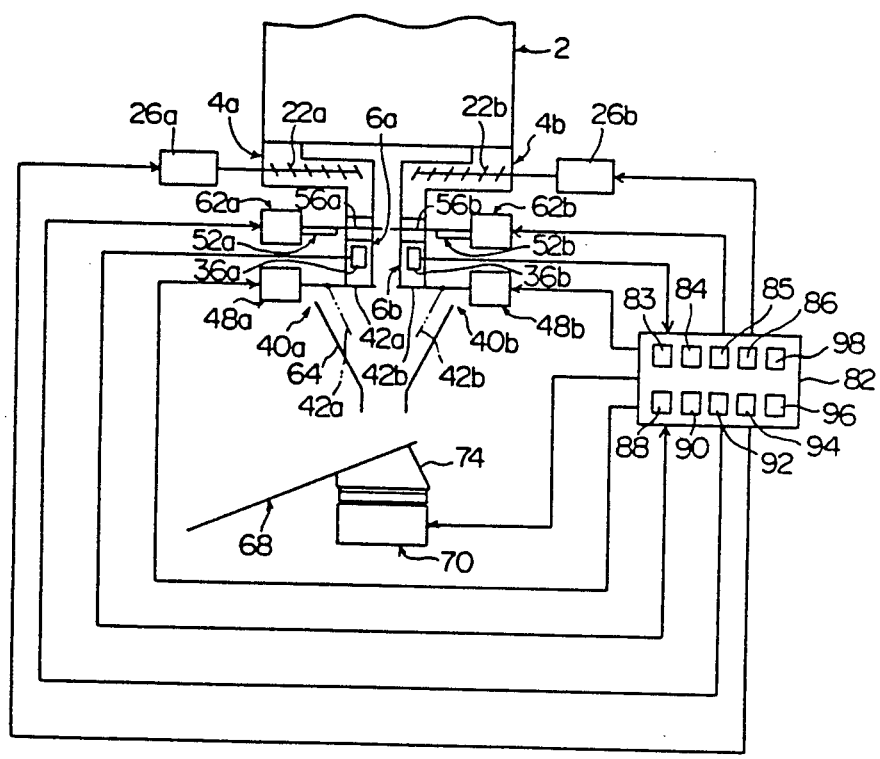
FIG. 4 is a simplified view showing a control system for the powder feeding apparatus of FIG. 1.

The illustrated transfer means 4a and 4b are of substantially the same structure, and so are the metering hoppers 6a and 6b. In the following description, only one of them will be taken up. In the illustrated embodiment, the transfer means 4a (4b) is equipped with a hollow cylindrical member 20a (20b) substantially horizontally disposed below the holding hopper 2 and a helical member 22a (22b) disposed within the hollow cylindrical member 20a (20b) (FIG. 4). The opposite ends of the hollow cylindrical member 20a (20b) are closed, and the helical member 22a (22b) is rotatably mounted between both end walls 24a (24b) (one of which is shown in FIG. 2) of the hollow cylindrical member 20a (20b). A driving source 26a (26b) such as an electric motor is mounted on one end wall 24a (24b) of the hollow cylindrical member 20a (20b) and is drivingly coupled to the helical member 22a (22b). An opening is formed in the upper part of one end portion of the hollow cylindrical member 20a (20b), and an opening 28a (28b) (FIG. 1) is also formed at a required site in the bottom wall 8 of the holding hopper. These openings are connected to each other by a hollow connector 30a (30b). An opening is also formed in the lower part of the other end portion of the hollow cylindrical member 20a (20b) (see FIG. 4 also). Hence, when the helical member 22a (22b) is rotated in a predetermined direction by the action of the driving source 26a (26b), the powdery material supplied to one end portion of the hollow cylindrical member 20a (20b) through the opening 28a (28b) formed in the bottom wall 8 of the holding hopper 2 is transferred in the direction shown by an arrow 32 (FIG. 1), and supplied to the metering hopper 6a (6b) through the opening formed in the other end portion.

The metering hopper 6a (6b) is disposed below the other end portion of the hollow cylindrical member 20a (20b). The illustrated metering hopper 6a (6b) is constructed of a cylindrical hopper 34a (34b) and supported via a load cell 36a (36b) constituting a weight measuring means by a supporting member 38a (38b) mounted on the frame structure 13. An introduction opening is defined at the upper end of the hopper 34a (34b), and a discharge opening is defined at its lower end. An opening and closing means 40a (40b) for opening and closing the discharge opening is disposed at the discharge opening of the hopper 34a (34b). The opening and closing means 40a (40b) has a plate-like opening and closing member 42a (42b), and mounted via a shaft member on a supporting portion 44a (44b) provided in the hopper 34a (34b) so that it is free to open and close the discharge opening. The output portion of an actuating means 48a (48b) which may be constructed of, for example, a pneumatic cylinder mechanism 46a (46b) is linked to the opening and closing member 42a (42b) via an arm member 50. When the actuating means 48a (48b) is in the deenergized state (the pneumatic cylinder mechanism 46a (46b) is contracted), the opening and closing member 42a (42b) is held at a closing position shown in FIG. 2 by a broken line and in FIG. 4 by a solid line, and therefore, closes the discharge opening of the hopper 34a (34b) to prevent the powdery material in the hopper 34a (34b) from being discharged. On the other hand, when the actuating means 48a (48b) is energized (the pneumatic cylinder mechanism 46a (46b) is stretched), the opening and closing member 42a (42b) is held at an opening position shown by a two-dot chain line in FIGS. 2 and 4. Consequently, the opening and closing member 42a (42b) opens the discharge opening of the hopper 34a (34b) and the powdery material in the hopper 34a (34b) is discharged through the discharge opening.

In the illustrated embodiment, a shutter means 52a (52b) is disposed between the hollow cylindrical member 20a (20b) and the hopper 34a (34b). The illustrated shutter means 52a (52b) includes a fixing body 54a (54b) and a cut plate 56a (56b) (FIG. 4) mounted on the fixing body 54a (54b). In the illustrated embodiment, a hollow cylindrical member 58a (58b) communicating with the above opening is connected to the other end portion of the hollow cylindrical member 20a (20b) of the transfer means 4a (4b), and the fixing body 54a (54b) of the shutter means 52a (52b) is mounted on the lower end of the hollow cylindrical member 58a (58b). The fixing body 54a (54b) has formed therein a through opening communicating with the opening formed in the other end portion of the hollow cylindrical member 20a (20b) and the introduction opening of the hopper 34a (34b). A cut plate 56a (56b) is movably mounted so as to open or close the through opening (see FIG. 4). A plate actuating means 62a (62b) which may be constructed of, for example, a pneumatic cylinder mechanism 60a (60b) is connected to the cut plate 56a (56b). The cut plate 56a (56b) is directly mounted on the output portion of the plate actuating means 62a (62b). Accordingly, when the plate actuating means 62a (62b) is in the deenergized state (the pneumatic cylinder mechanism 60a (60b) is contracted), the cut plate 56a (56b) is held at an opening position (not shown) at which it opens the introduction opening of the hopper 34a (34b), and the powdery material from the transfer means 4a (4b) is supplied to the hopper 34a (34b) through the introduction opening. On the other hand, when the plate actuating means 62a (62b) is energized (the pneumatic cylinder mechanism 60a (60b) is stretched), the cut plate 56a (56b) is held at a closing position (the position shown in FIG. 4) at which it closes the introduction opening of the hopper 34a (34b), and the supplying of the powdery material from the transfer means 4a (4b) to the hopper 34a (34b) is stopped.

A collecting member 64 having a cross section progressively decreasing downwardly is disposed below the metering hopper 6a (6b), and supported on a supporting member 66 of the frame structure 13 via a linking member (not shown).

Figure 3:
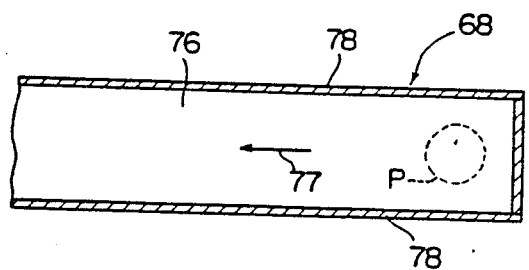
FIG. 3 is a cross-sectional view showing a trough in a level feeding means annexed to the powder feeding apparatus.

Below the collecting member 64 is disposed a level feeding means 67 equipped with a trough 68 and a vibration generator 70. A securing frame member 74 is mounted on a vibration output portion 72 of the vibration generator 70. One end portion of the trough 68 is mounted on the securing frame member 74 in a required manner. As shown in FIG. 3, the trough 68 has an elongate bottom wall 76, two side walls 78 extending upwardly from the two side ends of the bottom wall 76 and an upper wall (not shown), and is inclined downwardly (see FIG. 2) in the direction of transferring the powdery material shown by an arrow 77 (FIG. 3). An opening is formed in one end portion of the upper wall of the trough 68, and the opening of the trough 68 is connected to the opening at the lower end of the collecting member 64 by a stretchable connecting member 80 such as a flexible joint. Because of the above construction, the powdery material discharged from the metering hoppers 6a and 6b is discharged into the trough 68 as shown by a two-dot chain line P in FIG. 3 through the collecting member 64 and the stretchable connecting member 80 and conveyed downstream in the direction shown by the arrow 77 by vibrations generated from the vibration generator 70.

Now, with reference mainly to FIG. 4, the control system for the illustrated powder feeding apparatus will be described. The illustrated powder feeding apparatus further comprises a control means 82 for controlling the various constituent elements. The control means 82 may be constructed of, for example, a microprocessor, and includes a first timer means 83 and a second timer means 84, a discharge interval setting means 85 for setting a discharge interval of the metering hoppers 6a and 6b, and a discharge interval correcting means 86 for correcting a standard discharge interval set by the discharge interval setting means 85. In the illustrated embodiment, the control means 82 further comprises a supply weight setting means 88 for setting the weight of the powdery material supplied per unit time. The supply weight setting means 88 and the discharge amount setting means for setting a standard discharge weight of the powdery material supplied every time the opening and closing means 40a and 40b are opened. The discharge interval setting means 85 includes a discharge interval setting dial (not shown), and the discharge interval set by the setting dial is stored in a memory means 90 in the control means 82. The supply weight setting means 88 includes a supply weight setting dial (not shown), and the standard discharge weight determined by the supply weight set by the supply weight setting dial and the discharge interval set by the discharge interval setting means 85 is stored in a memory means 92 of the control means 82. For example, if the supply weight per hour is set at 120 kg by the supply weight setting dial and the discharge interval is set at 6 seconds by the discharge interval setting dial, the standard discharge weight becomes 200 g. In the illustrated embodiment, the powder feeding apparatus has two metering hoppers 6a and 6b, and the opening and closing means 40a and 40b are alternately opened. In this case, the discharge interval is a time interval running from the time when one of the opening and closing means 40a (or 40b) is held at the opening position to the time at which the other opening and closing means 40b (or 40a) is held at the opening position.

In the illustrated embodiment, the opening and closing means 40a and 40b are held at the opening position alternately as described below. This is, however, not essential, and when the powdery material in the standard discharge weight can be supplied to the metering hopper 6a (or 6b) within a prescribed discharge interval, the opening and closing means 40a (or 40b) may be opened or closed by utilizing only one of the metering hoppers 6a and 6b.

Generally, the standard discharge weight $W_0$ is given by the following equation.

$$W_0 = \frac{F \times T}{3600}$$

where

F is the weight of the powdery material fed per hour (kg/hour),

T is the discharging interval of the metering hopper (seconds).

The correction of the discharging interval by the discharge interval correcting means 86 will be described hereinafter.

In this control system, measured signals from the load cells 36a and 36b are fed into the control means 82. Operation signals produced in the control means 82 are fed into, for example, the driving sources 26a and 26b of the transfer means 4a and 4b, the actuating means 48a and 48b and the plate actuating means 62a and 62b.

The controlling action of the control means 82 will be described below with reference mainly to FIGS. 4, 5-A and 5-B.

To start to supply the powdery material, a main switch (not shown) of the apparatus is closed, the supply weight of the powdery material per unit time is set by the supply weight setting dial (not shown), and the discharging interval of the metering hoppers 6a and 6b is set by the discharge interval setting means (not shown). If the discharging interval of the metering hoppers 6a and 6b is set at 6 seconds, for example, this discharge interval of 6 seconds is stored in the memory means 90 of the control means 82. Furthermore, if the supply weight per unit time is set at 120 kg/hour, for example, a standard discharge weight (the target weight value) of 200 g calculated from the supply weight and the discharge interval is stored in the memory means 92 of the control means 82. Then, a supply start switch (not shown) is closed. As a result, step n-1 sets in, and the driving source 26a of the transfer means 4a is energized to cause rotation of the helical member 22a in a predetermined direction. The powdery material in the holding hopper 2 is moved in the direction shown by arrow 32 (FIG. 1) by the action of the helical member 22a and supplied to the metering hopper 6a through the hollow cylindrical member 58a and the shutter means 52a at the opening position. Then, step n-2 sets in, and it is determined whether or not the weight of the powdery material that has been supplied to the metering hopper 6a is near the target weight value (the standard discharge weight every time the opening and closing means 40a is opened). The control means 82 compares the target weight value (for example, 200 g) with the measured value in the load cell 36a, and energizes the driving source 26a until the measured value exceeds 180 g, for example. When the measured value exceeds 180 g, step n-3 sets in to deenergize the driving source 26a. As a result, the rotation of the helical member 22 is stopped, and the supply of the powdery material from the holding hopper 2 is stopped. Thereafter, step n-4 starts and energizes the actuating means 62a. Consequently, the cut plate 56a is brought to the closing position from the opening position to prevent the powdery material accurately from flowing into the metering hopper 6a. Step n-5 then sets in, and the weight of the powdery material that has been flowed into the metering hopper 6a is measured by the load cell 36a. The measured signal generated by this measurement is fed into the control means 82 and stored in the memory means 94 (FIG. 4).

Thereafter, step n-6 sets in to energize the actuating means 48a. As a result, the opening and closing member 42a is brought to the opening position from the closing position to permit the powdery material metered in the metering hopper 6a to fall through the dischage opening. Then, in step n-7, the first timer means 83 is started. After the lapse of a predetermined time from the starting point of the first timer means 83, the discharge opening of the other metering hopper 6b is opened. Step n-8 determines whether the measured value in the load cell 36a is near zero or not. If, for example, the measured value is less than 3 g, the powdery material is regarded as having been discharged from the metering hopper 6a, and step n-9 starts. In step n-9, the actuating means 48a is deenergized. As a result, the opening and closing member 42a is brought to the closing position from the opening position to accurately prevent discharging of the powdery material from the metering hopper 6a. Then step n-10 sets in, and the weight of the powdery material remaining in the metering hopper 6a is measured by the load cell 36a. Generally, the powdery material received in the metering hopper 6a cannot all be discharged for sure, and part of it remains adhering to the inside surface of the metering hopper 6a. Accordingly, in the illustrated embodiment, the weight of the powdery material which has flowed into the metering hopper 6a is measured in step n-5, and the weight of the powdery material remaining in the metering hopper 6a is measured in step n-10. On the basis of these measured weights, the weight of the powdery material actually discharged from the metering hopper 6 is calculated. The discharging interval is corrected on the basis of the calculated discharge weight and the target weight memorized in the memory means 92. Specifically, in step n-11, the discharge interval correcting means 86 compares the weight of the powdery material actually discharged from the metering hopper 6a with the target weight stored in the memory means 92. When the discharge weight is larger than the target weight, the discharging interval is corrected so that it becomes large substantially in proportion to the difference between these weight values. When the discharge weight is smaller than the target weight, the discharge interval is corrected so that it becomes small substantially in proportion to the difference between these weights. In more detail, the discharge interval correcting means 86 corrects the discharge interval T (sec) to a value given by the following equation.

$$T = T_0 + \frac{W_s - W_0}{W_0} \times T_0$$

$T_0$: the standard discharge interval of the metering hopper $W_0$: the standard discharge weight of the metering hopper $W_s$: the weight discharged from the metering hopper.

As a result of this correction, the amount of the powdery material fed per unit time becomes constant substantially irrespective of the adhesion of the powdery material to the inside surface of the metering hopper 6a.

When the discharge interval is corrected as above by the discharge interval correcting means 86, the corrected discharge interval is stored in a memory means 96 of the control means 82, and the set-up time of the first timer means 83 is changed to this corrected value, in step n-12.

Then, step n-13 sets in, and the driving source 26a is energized. As a result, the helical member 22a is rotated as stated above, and the supplying of the powdery material from the holding hopper 2 is resumed. When in step n-14, the actuating means 62a is deenergized, the cut plate 56a is brought to the opening position from the closing position, and the flowing of the powdery material into the metering hopper 6a is started. When in step n-15, it is determined that the measured value in the load cell 36a becomes near the target weight (for example, when the measured value exceeds 180 g), the operation goes from step n-15 to step n-16, and the driving source 26a is deenergized. As a result, the rotation of the helical member 22a is stopped, and the supplying of the powdery material from the holding hopper 2 is stopped. In step n-17, the actuating means 62a is energized to hold the cut plate 56a at the closing position and thereby hamper the flowing of the powdery material into the metering hopper 6a. When the flowing of the powdery material into the hopper 6a is over, the weight of the powdery material that has flowed into the metering hopper 6a is measured in step n-18 and the measured value is stored in the memory means 94 in the same way as described above.

Then, when the corrected time (the time interval stored in the memory means 96 in step n-12) elapses from the starting of the first timer means 83 in step n-7, the operation goes to steps n-20 and n-21. In step n-20, the first timer means 83 stops timing, and in step n-21, the powdery material is supplied from the other metering hopper 6b.

When in the illustrated embodiment, the supply start switch (not shown) is closed, step n-22 also sets in to energize the driving source 26b of the transfer means 4b. As a result, the helical member 22b is rotated in a predetermined direction, and the powdery material in the holding hopper 2 is moved in the direction of arrow 32 (FIG. 1) by the action of the helical member 22b. The powdery material then passes through the hollow cylindrical member 58b and the shutter means 52b at the opening position, and is supplied to the metering hopper 6b. Then, step n-23 sets in, and it is determined whether or not the weight of the powdery material that has flowed into the metering hopper 6b is near the target weight value (the standard discharge weight of the powdery material supplied every time the opening and closing means 40b is opened). The control means 82 compares the target weight value (for example, 200 g) with the measured value in the load cell 36b, and energizes the driving source 36b until the measured values exceeds 180 g, for example. When the measured value exceeds 180 g, for example, step n-24 sets in to deenergize the driving source 26b. As a result, the rotation of the helical member 22b is stopped, and the supplying of the powdery material from the holding hopper 2 is stopped. Thereafter, step n-25 sets in and the actuating means 62b is energized to bring the cut plate 56b to the closed position from the opening position whereby the flowing of the powdery material into the metering hopper 6b is accurately hampered. Furthermore, step n-26 sets in, and the weight of the powdery material which has flowed into the metering hopper 6b is measured by the load cell 36b. The measured signal in this measurement is fed into the control means 82, and the measured value is stored in a memory means 98 (FIG. 4) of the control means 82.

When the operation goes from step n-19 (FIG. 5-A) to step n-21 (FIG. 5-B), the actuating means 48b is energized. As a result, the opening and closing member 42b is brought to the opening position from the closing position and the powdery material metered by the metering hopper 6b falls through the discharge opening. Then, step n-27 sets in, and the second timer means 84 starts timing. After the lapse of a predetermined period of time from the starting of the second timer means 84, the discharge opening of the metering hopper 6a becomes open. In step n-28, it is determined whether or not the measured value in the load cell 36b is near zero.

For example, if the measured value is less than 3 g, the powdery material is regarded as having been discharged from the metering hopper 6b, and step n-29 sets in. In step n-29, the actuating means 48b is deenergized. As a result, the opening and closing member 42b is brought to the closing position from the opening position, and the discharging of the powdery material from the metering hopper 6b is accurately hampered. Then, step n-30 sets in, and the weight of the powdery material remaining in the metering hopper 6b is measured by the load cell 36b. The weight of the powdery material actually discharged from the metering hopper 6b is calculated on the basis of measured value measured in step n-26 and the measured value measured in step n-30, and the discharging interval is corrected on the basis of the discharge weight so calculated and the target weight stored in the memory means 92. Specifically, in step n-31, the discharge interval correcting means 86 compares the weight of the powdery material actually discharged from the metering hopper 6b with the target weight stored in the memory means 92. When the discharge weight is larger than the target weight, the discharge interval is corrected so that it becomes larger substantially in proportion to the difference between these weight values. When the discharge weight is smaller than the target weight, it corrects the discharge interval so that it becomes smaller substantially in proportion to the difference between these weight values. When the discharge interval is corrected as above by the discharge interval correcting means 86, the corrected discharge interval is stored in a memory means 96 of the control means 82, and the set-up time of the second timer means 84 is changed to the corrected value, in step n-32.

Then, step n-33 sets in, and the driving source 26b is energized. As a result, the helical member 22b is rotated as stated above and the supplying of the powder material from the holding hopper 2 is resumed. When the actuating means 62b is deenergized in step n-34, the cut plate 56b is brought to the opening position from the closing position, and the powdery material starts to flow into the metering hopper 6b. When the measured value in the load cell 36b reaches the target weight value (for example, when the measured value exceeds 180 g) in step n-35, step n-36 sets in and the driving source 26b is deenergized. As a result, the helical member 22b stops rotating and the supplying of the powdery material from the holding hopper 2 is stopped. Furthermore, in step n-37, the actuating means 62b is energized and the cut plate 56b is held at the closing position to hamper the flowing of the powdery material into the metering hopper 6b. When the flowing of the powdery material into the metering hopper 6b comes to an end, the weight of the powdery material that has flowed into the metering hopper 6a is measured (in step n-38, and the measured value is stored in a memory means 98 as stated hereinabove.

Thereafter, when the corrected period of time (the time interval memorized in the memory means 96 in step n-32) has elapsed from the starting of the second timer means 84 in step n-27, step n-40 sets in and the operation returns to step n-6. In step n-40, the second timer means 84 stops timing, and in step n-6, the powdery material is discharged from the metering hopper 6a. Thereafter, the operation described above is repeatedly performed, and the powdery material is discharged alternately from the metering hoppers 6a and 6b. In the subsequent operations, the discharge interval correcting means 86 calculates the weight of the powdery material actually discharged from the metering hopper 6a on the basis of the measured value in step n-10 and the measured values in step n-18 and also the weight of the powdery material actually discharged from the other metering hopper 6b on the basis of the measured value in step n-30 and the measured value in step n-38.

When the powdery material is discharged from the metering hoppers 6a and 6b, the discharged powdery material falls onto one end portion of the trough 68 through the collecting member 64 and the connecting member 80 as shown by the two-dot chain line P in FIG. 3. Since the trough 68 is being vibrated by the action of the vibration generator 70 (energized when the supply start switch is closed), the powdery material discharged as above is conveyed in the direction shown by arrow 77 (FIG. 3), and fully leveled during conveyance, by the action of the level feeding means 67. Thus, the powdery material leveled in a layer form is continuously fed further downstream from the trough 68.

While the powder feeding apparatus of this invention has been described with reference to its one specific embodiment, it should be understood that the invention is not limited to this specific embodiment, and various changes and modification are possible without departing from the scope of the invention.

For example, in the illustrated embodiment, the standard discharge interval is set by the discharge interval setting means and the standard discharge weight is determined by the standard discharge interval and the supply weight set by the supply weight setting means. If desired, another method may be employed. For example, it is possible to set the standard discharge interval by the discharge interval setting means and set the standard discharge weight by a discharge weight setting means.

In the illustrated embodiment, both of the standard discharge interval and the standard discharge weight are variable. Alternatively, the amount of the powdery material may be changed by changing the standard discharge weight while maintaining the standard discharge interval constant, or the amount of the powdery material supplied may be changed by changing the standard discharge interval while maintaining the standard discharge weight constant.

Furthermore, in the illustrated embodiment, the discharge interval is corrected by comparing the amount of the powdery material actually discharged from the metering hopper with the standard discharge weight. To simplify the controlling operation, the discharge interval may be corrected by comparing the weight of the powdery material that has flowed into the metering hopper with the standard discharge weight.

In the illustrated embodiment, the powder feeding apparatus is limited to the type having two metering hoppers. This is not limitative, however, and the foregoing description may equally be applied to other types of the powder feeding apparatus having one metering hopper or three or more metering hoppers.

We claim:

1. A powder feeding apparatus comprising a holding hopper for holding a powdery material, a metering hopper for metering the powdery material supplied from the holding hopper, a weight measuring means for measuring the weight of the powdery material in the metering hopper, an opening and closing means adapted to be selectively held at an opening position at which it opens a discharge opening in the metering hopper and a closing position at which it closes the discharge opening and a control means for controlling the actuation of the opening and closing means, the control means having a timer means for timing a discharge interval and a discharge interval setting means for setting the discharge interval of the powdery material; wherein the control means further includes a discharge interval correcting means for correcting a standard discharge interval set by the discharge interval setting means, said discharge interval correcting means comparing a standard discharge weight of the powdery material supplied every time the opening and closing means opens the discharge opening of the metering hopper with the weight of the powdery material actually discharged from the metering hopper; and, when the weight of the powdery material actually discharged from the metering hopper is larger than the standard discharge weight, said correcting means corrects the discharge interval so that it becomes longer than the standard discharge interval; and, when the weight of the powdery material actually discharged from the metering hopper is smaller than the standard discharge weight, said correcting means corrects the discharge interval so that it becomes shorter than the standard discharge interval.

2. The powder feeding apparatus of claim 1 in which the control means is provided with a discharge weight setting means for setting the standard discharge weight of the powdery material supplied every time the opening and closing means opens the discharge opening of the metering hopper.

3. The powder feeding apparatus of claim 1 which further comprises level feeding means for leveling and feeding the powdery material discharged from the metering hopper.

4. The powder feeding apparatus of claim 1, wherein the timer means commences the timing of the discharge interval upon an opening of said opening and closing means.

5. The powder feeding apparatus of claim 4, wherein the timer means terminates the timing of the discharge interval upon the opening of another opening and closing means.

* * * * *